March 31, 1931.  J. B. MacNEILL  1,798,691
NETWORK PROTECTIVE DEVICE
Filed Jan. 27, 1925  5 Sheets-Sheet 1

WITNESSES:

INVENTOR
John B. MacNeill
BY
ATTORNEY

March 31, 1931. J. B. MacNEILL 1,798,691
NETWORK PROTECTIVE DEVICE
Filed Jan. 27, 1925  5 Sheets-Sheet 3

WITNESSES:
A.J. Schiefelbein
Lester J. Budlong

INVENTOR
John B. MacNeill.
BY
Wesley S. Carr
ATTORNEY

March 31, 1931.  J. B. MacNEILL  1,798,691
NETWORK PROTECTIVE DEVICE
Filed Jan. 27, 1925   5 Sheets-Sheet 4

WITNESSES:
A.G. Schiefelbein.
Lester J. Budlong.

INVENTOR
John B. MacNeill.
BY
Wesley G. Carr
ATTORNEY

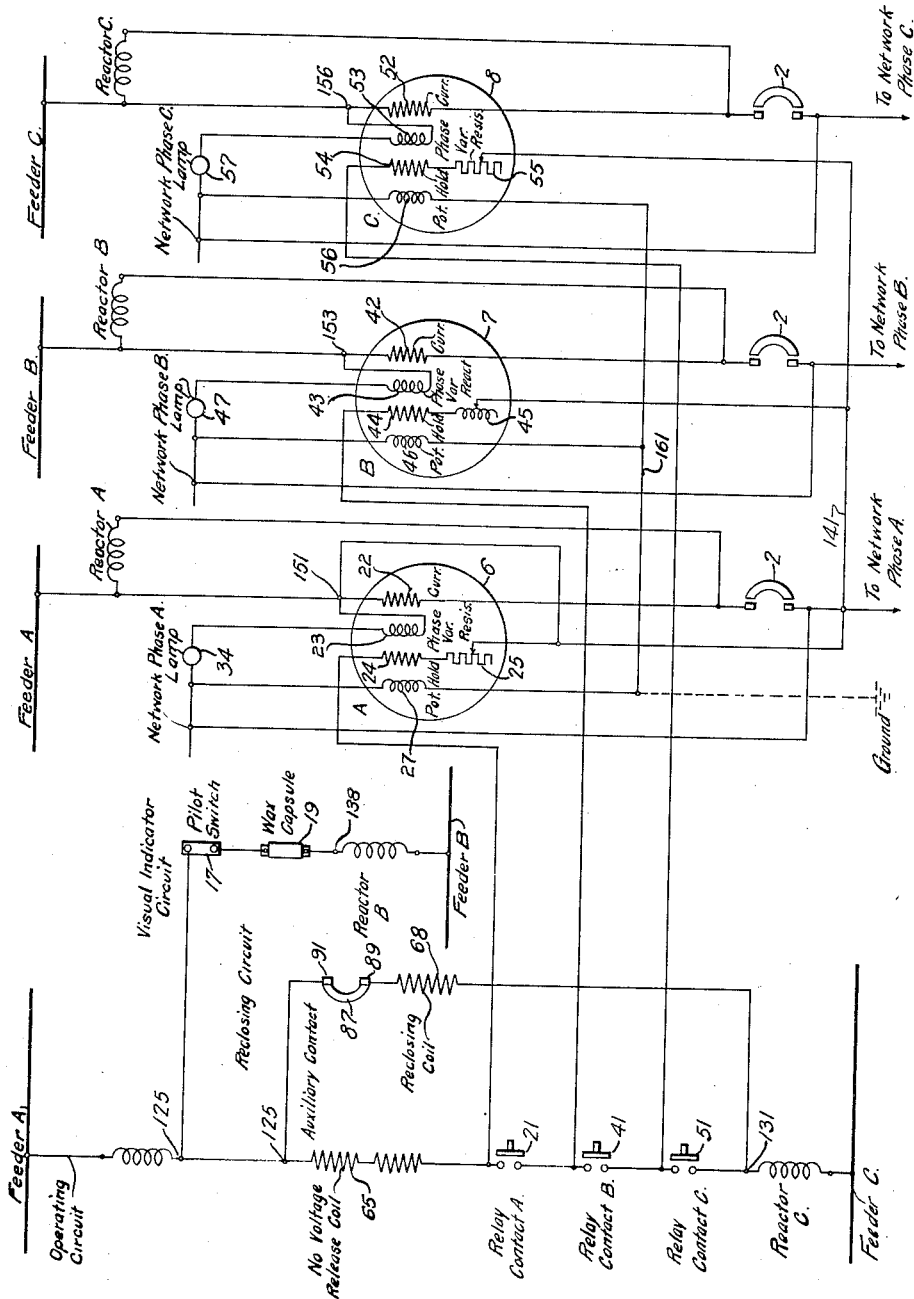

Patented Mar. 31, 1931

1,798,691

UNITED STATES PATENT OFFICE

JOHN B. MacNEILL, OF WILKINSBURG, PENNSYLVANIA, ASSIGNOR TO WESTINGHOUSE ELECTRIC & MANUFACTURING COMPANY, A CORPORATION OF PENNSYLVANIA

NETWORK PROTECTIVE DEVICE

Application filed January 27, 1925. Serial No. 5,175.

My invention relates to alternating-current distributing systems and particularly to electrical network protective devices for automatically disconnecting faulty feeders from such networks and for reconnecting them upon the restoration of normal conditions.

One object of my invention is to provide an electrical protective device for an alternating-current network system that is responsive to conditions of current-reversal, phase relation and voltage thereacross.

Another object of my invention is to provide an electrical protective device for a polyphase circuit that shall operate to disconnect the circuit upon the occurrence of current reversal in any phase or upon the occurrence of undesired voltage or potential conditions across the device.

It is a further object of my invention to provide an electrical protective device for a polyphase circuit having a common operative mechanism for all the phase contactors, that shall be responsive to conditions of current reversal, phase relation and potential drop thereacross in each of the phases thereof.

It is yet another object of my invention to provide an improved design of operating mechanism for a circuit interrupter having the foregoing characteristics.

In the accompanying drawings,

Fig. 5 is a schematic diagram of the circuit connections of my electrical protective device.

In the several figures of the drawing similar reference numerals indicate like parts.

Figure 1:
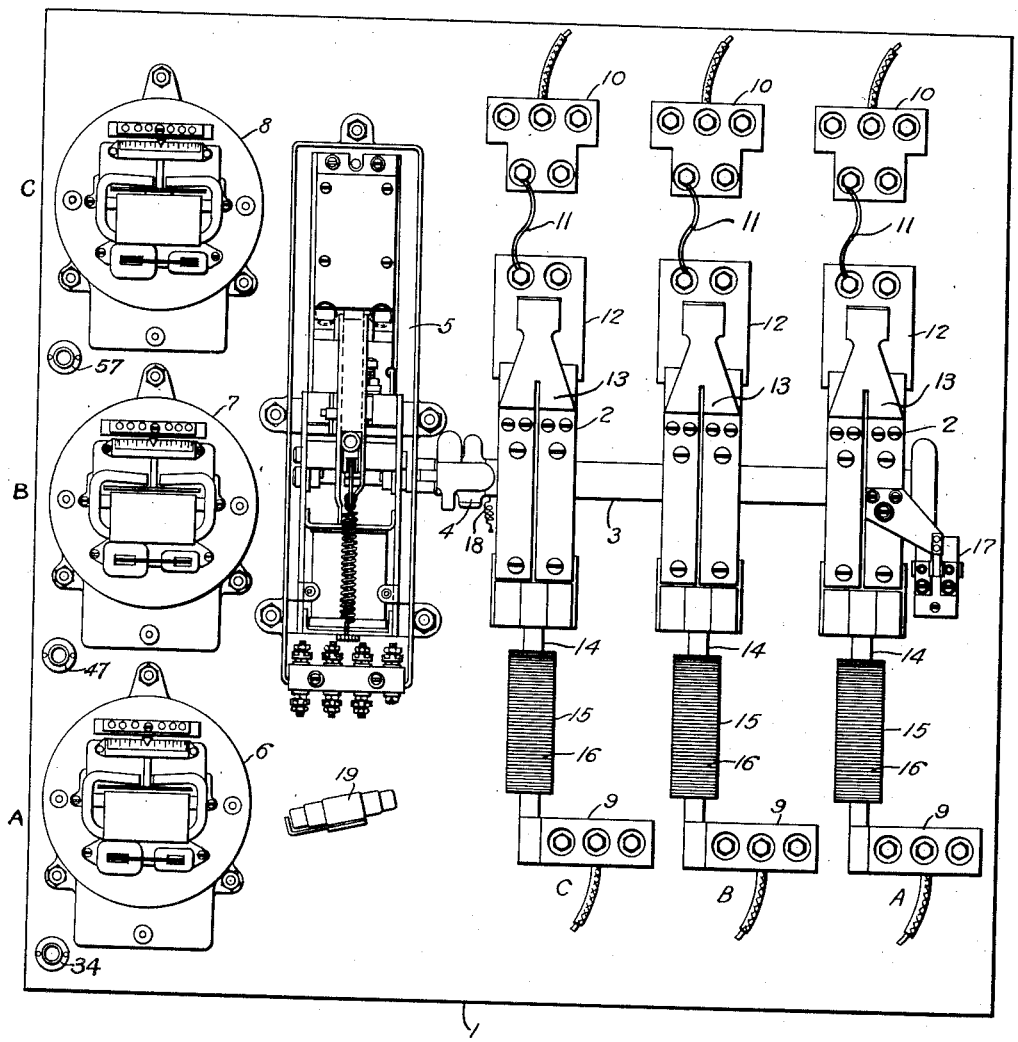
Figure 1 is an elevational view of a panel having mounted thereon the component parts of my electrical protective device.

Referring to Fig. 1, my invention comprises, in general, a panel 1 having any desired number of switches or contactors 2, the movable members of which are mounted on a common operating shaft 3 that, in turn, is connected through a flexible connection 4 to an operating device 5. The shaft-operating device 5 is controlled by a plurality of relays 6, 7 and 8 that are respectively connected to the different phase conductors A, B and C on the panel 1. The number of contactors 2 may be varied in accordance with the number of phases or the type of wiring that is found in the electrical system to which the protective device is connected, it being only necessary to add an additional relay for each additional phase. For that reason, the several contactors and the corresponding relays are referred to as being in phase A, B and C, as the case may be.

The panel 1 supports a plurality of terminals 9 that are connected to the supply circuits and a plurality of terminals 10 that are connected to the distribution or secondary network circuits. The terminals 10 are connected by suitable fuses 11 to stationary contact members 12. The terminals 9 are connected to the movable contact members 13 of contactors 2 by conductors 14 that are surrounded by a plurality of superimposed laminations 16 of metal constituting reactance coils 15. The contactors 2, are operated by the shaft 3 to effect engagement and disengagement of the movable and stationary contact members 12 and 13, respectively. A suitable pilot switch 17 may be connected to any one of the contactors 2.

The coupling 4 comprises any suitable form of link mechanism by which a turning movement may be imparted to the shaft 3 from the operating device 5 and that is capable of reversely actuating the operating device 5 from the shaft 3. For this purpose, a suitable retracting spring 18 is attached to the shaft 3. A combined resistor and wax capsule 19 is mounted on the panel for a purpose to be hereinafter described.

Figure 4:
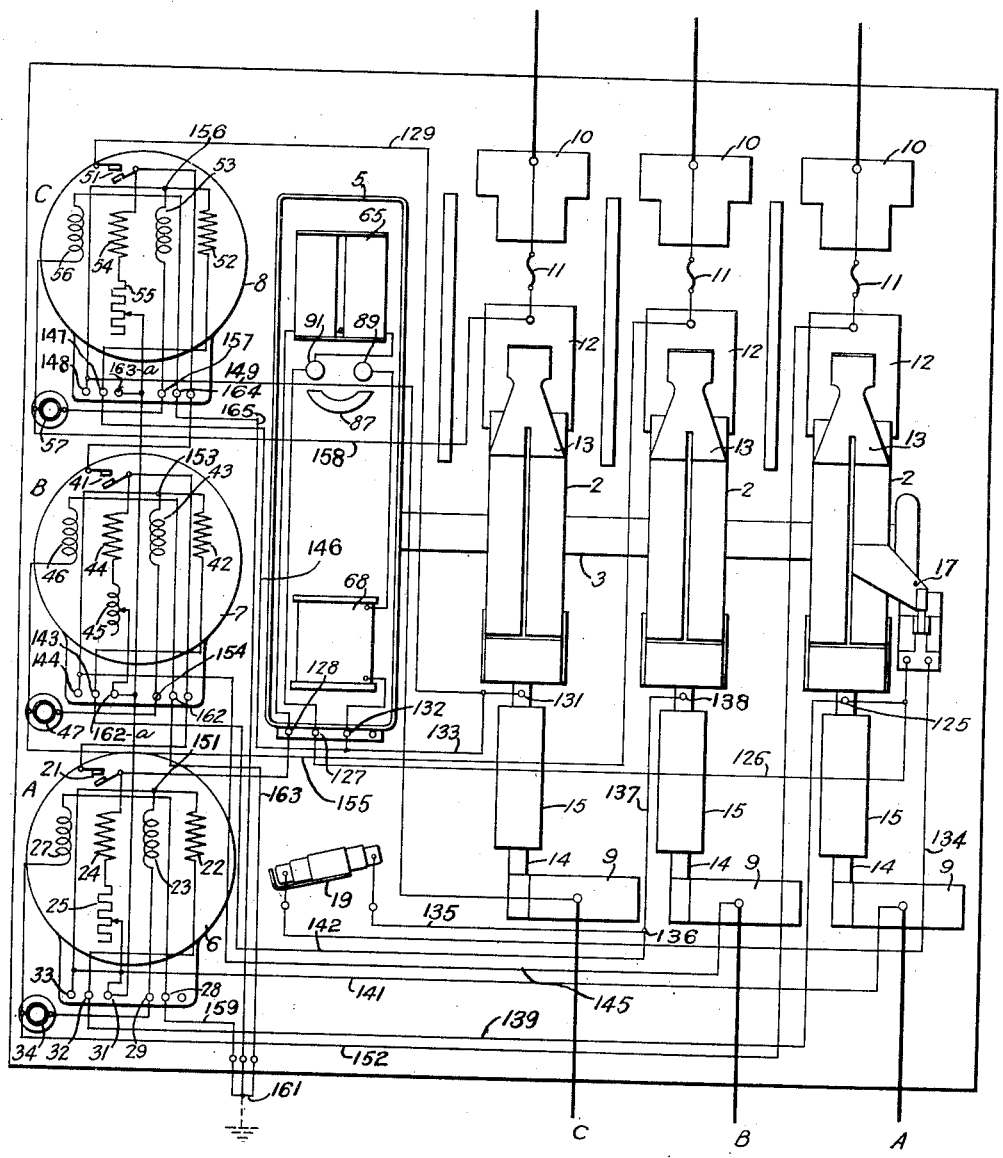
Fig. 4 is a diagrammatic view of circuits and apparatus embodying my invention.

Referring to Fig. 4, the relay 6 comprises a contactor 21, a current coil 22, a phasing coil 23, a holding coil 24 and a variable resistor 25 that are in series connection, and a potential coil 27. The relay 6 is provided with a plurality of terminal members 28, 29, 31, 32 and 33. A ballast and indicating lamp 34 is associated with the relay 6. The lamp 34 has preferably a tungsten filament having a hot and cold resistance value of the ratio ten to one. The lamp is subjected to voltages double the normal voltage as is hereinafter explained.

The relay 7 comprises a contactor 41, a current coil 42, a phasing coil 43, a holding coil 44 that is in series connection with a variable reactor 45, a potential winding 46 and suitable terminal members that are particularly described during the description of the several circuits. A ballast lamp 47 is associated with the relay 7.

The relay 8 comprises a contactor 51, a current coil 52, a phasing coil 53, a holding coil 54 that is in series connection with a variable resistor 55, a potential winding 56 and suitable terminal members that are referred to during the description of the several circuits. A ballast lamp 57 is associated with the relay 8.

Accordingly, the relays 6 and 8 are similar to each other and differ from the relay 7 in the use of variable resistors in lieu of the variable reactor that is found in relay 7 and in selecting the proper polarity for the several coils. By the arrangement of the variable resistors 25 and 55 and the variable reactor 45, it is possible to secure a desired phase relation in the several relays as will appear during a detailed discussion of the circuits of the device. The structural details of the relay systems is shown and described in the application of Jno. S. Parsons, filed June 27, 1925, Serial No. 39,947, and which is assigned to the Westinghouse Electric & Manufacturing Company.

Figure 2:
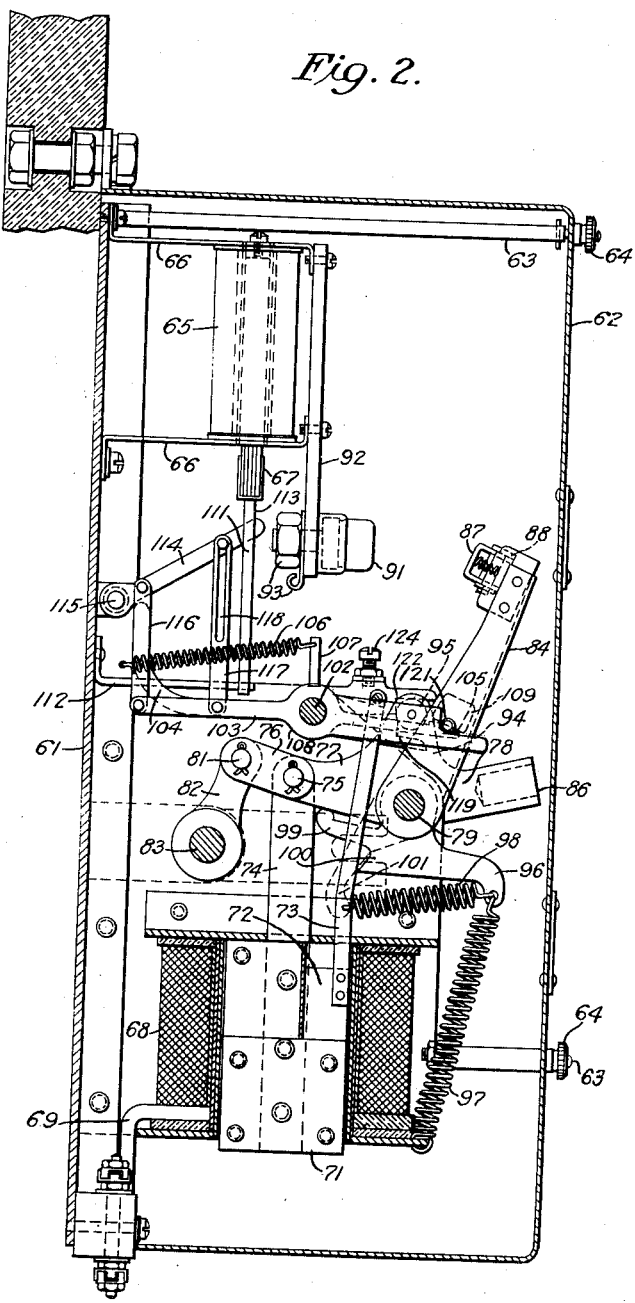
Fig. 2 is a view, partially in section and partially in elevation, of an operating device constituting an element of my protective device.
Figure 3:
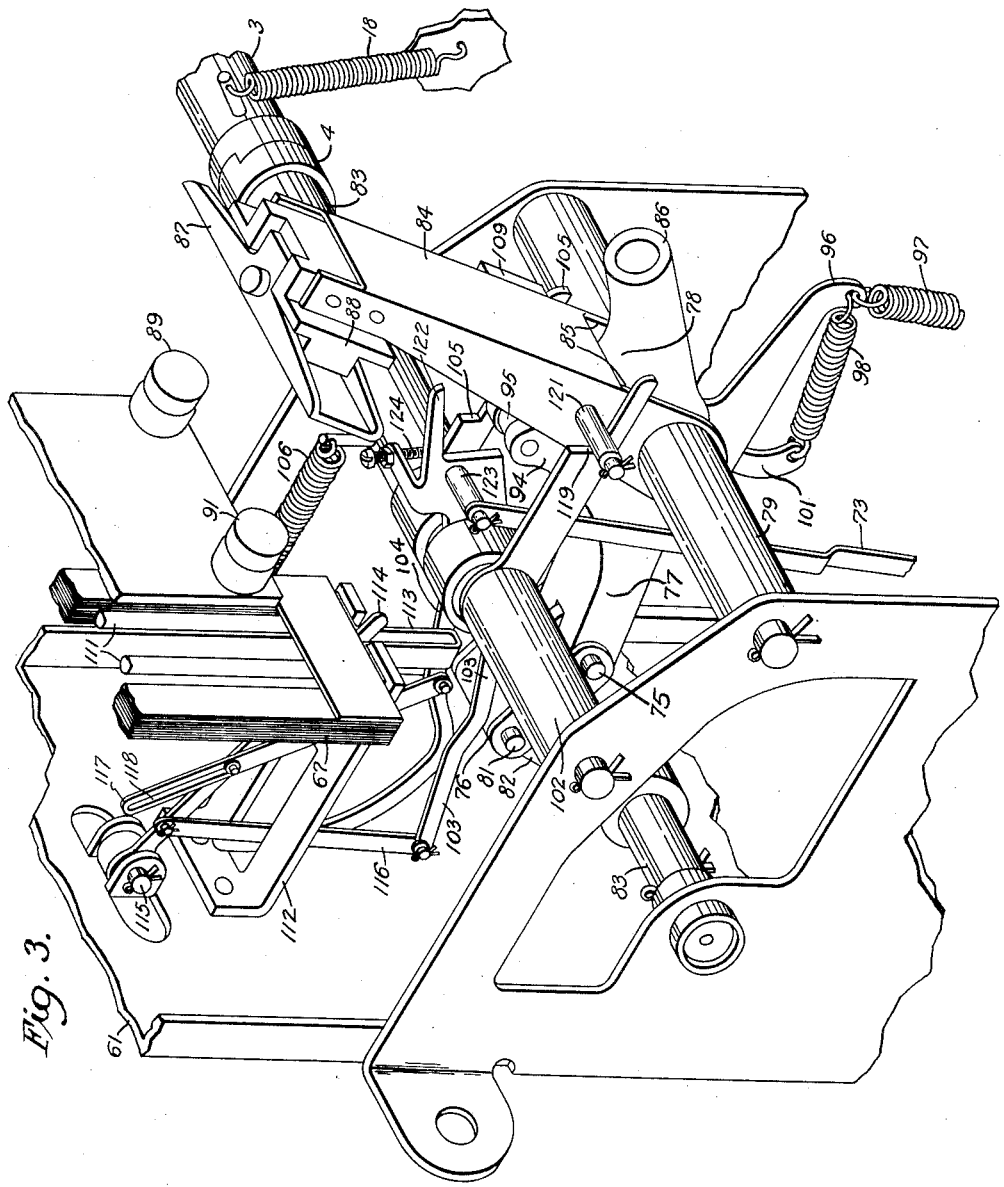
Fig. 3 is a fragmentary view in perspective of certain mechanical details of the operating device shown in Fig. 2.

Referring particularly to Figs. 2 and 3, the operating device 5 comprises a base member 61 to which a cover member 62 is secured by means of bolts 63 and nuts 64. A two-coil solenoid 65 is supported from the base member 61 by suitable brackets 66 and has a weighted armature member 67 that is normally disposed in its lower position as is shown in Fig. 3. A second solenoid 68 is supported by a bracket 69 from the base member 61 and is provided with a multi-unit armature member. The large unit 71 of the armature member is adapted to be moved in a downward position when the contactors 2 are in their open position, and a smaller unit 72 that is permitted to move upwardly relatively to the solenoid 68 when a connecting rod 73 is manipulated. The armature unit 71 is connected by a rod 74 to a pin 75 that secures links 76 to an arm 77 of a crank 78 pivotally mounted on a shaft 79.

The links 76 are, in turn, connected by a pin 81 to an arm 82 that is attached to a shaft 83 that terminates in the coupling 4. A switch arm 84, the lower portion of which has bifurcations 85 that straddle a handle portion 86 of the crank 78, is loosely mounted on the shaft 79. A bridging contact member 87 is carried at the upper end of the arm 84, but is insulated therefrom by a suitable insulating body 88. The bridging member 87 co-operates with a pair of stationary contact members 89 and 91 that are supported by an insulating body 92 from the brackets 66. Suitable terminals 93 are attached to the rear ends of the stationary contact terminals 89 and 91 for the connection thereto of electrical conductors.

By reason of the independent connection of the crank 78 and the arm 84 to the shaft 79, the arm 84 is capable of a certain amount of independent movement about the shaft.

An arm 94 of the crank 78 terminates in a roller 95. A rocking lever 96 is loosely mounted on the shaft 79 and has secured, at one end thereof, springs 97 and 98. The other end 99 of the lever 96 bears against the under surface of the arm 77. An extension 100 thereon is adapted to engage a tail piece 101 on the arm 84 to which the other end of the spring 98 is also connected. The other end of the spring 97 is secured to the bracket 69, whereby the lever 96 is always biased in a clockwise direction and the arm 84 is always biased in a counter-clockwise direction as viewed in Figs. 2 and 3.

A shaft 102 is mounted on the base 61 above and between the shafts 83 and 79. A pair of levers 103 and 104 are mounted on the shaft 102 for movement relatively thereto. A latch 105 is also loosely mounted on the shaft 102 and is biased in a counter-clockwise direction by a spring 106 that it attached to a post 107 threaded into the base 108 of the latch 105. The latch 105 is adapted to engage a lug 109 that is mounted on one edge of the arm 84.

Movement of the armature 67 is controlled by guide members 111 that are mounted on a bracket 112 that is secured to the base member 61. A downwardly-bent strap 113 is attached to the lower surface of the armature member and in the loop so formed there is disposed the end of a lever 114, the other end of which is pivoted at 115 to the base 61. A link 116 connects one end of the lever 103 and the lever 114, while a link 117, that is provided with a slot 118, connects the lever 114 and the lever 104, whereby the lever 114 and the link 117 have a lost-motion connection. The other end of the lever 103 terminates in a notched surface 119 for co-operation with a pin 121 mounted on the saddle 84. The second end of the lever 104 terminates in a downwardly-directed notch 122 for co-operation with the roller 95. The lever 104 also carries a pin 123 to which is attached the rod 73, and an adjustable stop 124 that is adapted to strike the latch 105 under conditions hereinafter described.

Referring particularly to Figs. 4 and 5, the electrical connections of the protective device may be stated to consist of an operating circuit that extends between the phases A and C for the purpose of actuating the operating device, an indicating circuit that extends between the phases A and B and a plurality of relay circuits that are specific to each phase of the circuit. However, the holding coils of the several relays are an exception to the foregoing statement for the reason that they are all supplied with energy from phase A since they are connected to the operating circuit that, in turn, leads to phase conductor C.

A main operating circuit extends from a terminal 125 that is disposed on the conductor 14 of phase A beyond the reactor 15, through a conductor 126 to a terminal 127 of the operating device 5 to the stationary contact member 91. From the stationary contact member 91, the operating circuit divides. One branch of the operating circuit extends through the solenoid 65 to terminal 128 of the device 5, the contact 21 of relay 6, the contact 41 of relay 7 and the contact 51 of relay 8, through a conductor 129 to terminal 131 of phase C at a position similar to that of the terminal 125 of phase A. It is to be noted that the several relay contactors 21, 41 and 51 are thus connected in series with the solenoid 65. The other circuit extending from the stationary contact member 91 includes the bridging contact member 87, the stationary contact terminal 89, the second solenoid 68, a terminal 132 of the operating device 5, a conductor 133 and the terminal 131.

Referring particularly to Fig. 5, it will thus be seen that there are two parallel circuits extending from the terminal member 125 of phase A to the terminal member 131 of phase C. That circuit including the contact member 21, 41 and 51 is the operating circuit and that circuit including the bridging contact 87 and the solenoid 68 is the reclosing circuit.

The circuit for the wax capsule 19 extends from the terminal 125 through the pilot switch 17, a conductor 134, the wax capsule 19, a conductor 135, a terminal member 136, through a conductor 137 to a terminal member 138 on the conductor 14 of phase B that occupies a position similar to the terminal member 125 of phase A. The foregoing circuit is for the purpose of indicating, by the melting of the wax capsule, that the contactors 2 have remained in their open position an undue length of time with full voltage thereon.

The current coil 22 of the relay 6 is connected across the reactance 15 in phase A by a circuit extending from terminal 125 by a conductor 139 to the terminal member 32 of the relay, the winding 22, the terminal 33 of the relay, and a return conductor 141 to the terminal 9 of phase A. The current coil 42 of the relay 7 is similarly connected from terminal 138 by conductor 137 to terminal 136, conductor 142, a terminal 143 on relay 7, the winding 42, a terminal 144 on the relay 7 and a return conductor 145 to the terminal 9 of phase B. The current coil 52 of the relay 8 is connected from terminal 131 of phase C by conductor 133 to a terminal 132 of the operating device 5, a conductor 146, a terminal 147 of the relay 8, the current coil 52, through a terminal 148 of the relay 8 and a conductor 149 to the terminal 9 of phase C.

Accordingly, the several current windings of the relays 6, 7 and 8 are connected across the reactors in their associated phases. The current windings of the several relays impart a directional component to the operation of the relays and in combination with the other coils hereinafter described, constitute protective means against conditions of reversal of power through the several contactors 2.

The phasing coil 23 of the relay 6 is connected in a circuit extending from the terminal member 151 connected to the current coil 22, the circuit of which has previously been described, through the coil 23, terminal member 29 of the relay 6, lamp 34 and a conductor 152 to the terminal member 12 of phase A. The phasing coil 43 of the relay 7 is connected in a circuit extending from a terminal member 153 of current coil 42, through the coil 43, a terminal 154 of relay 7, lamp 47 and a conductor 155 that extends to the terminal 12 of phase B. The phasing coil 53 of relay 8 is connected in a circuit extending from a terminal 156 of current coil 52 of relay 8, through the coil 53, a terminal 157 of the relay 8, lamp 57, and a conductor 158 to terminal 12 of contactor 2 of phase C. Accordingly, the several phasing coils are connected across the contactors 2 and the brilliancy of the lamps in circuit therewith, when the contactors 2 are in their open positions, indicates that the circuits including the respective sides of the associated contactor 2 are out of phase and that the contactors 2 should not be closed. The several lamps also serve as current limiting resistors for protecting the phasing coils. The several windings 23, 43 and 53, when thus energized, prevent the closing of their associated contactors 21, 41 and 51, respectively.

The potential winding 27 of the relay 6 is connected between a terminal of the lamp 34 in the phasing circuit heretofore described and the terminal 28 of the relay 6 that in turn is connected by a conductor 159 to a neutral conductor 161. Similarly the potential coil 46 of the relay 7 is connected between a terminal of the lamp 47 and a terminal 162 of the relay 7, that in turn is connected by a conductor 163 to the neutral conductor 161. The potential coil 56 of the relay 8 is likewise connected between a terminal of its associated lamp 57, a relay terminal member 164 and a conductor 165 to the neutral conductor 161. Inasmuch as the several phasing coils are connected to the terminal members 12 on the distribution side of the contactors 2, the potential coils reflect the voltage of the secondary side of the device rather than the voltage on the supply side. The several relays are so wound that they will not close unless the potential on the supply side of the device is in excess of the potential on the distributing side. The neutral conductor 161 may be grounded or not as desired, in accordance with the type of system to which the device is applied.

The holding coil 24 of the relay 5 is connected in a circuit extending from terminal 9 of phase A through conductor 141, terminal 31 of the relay 6, the variable resistor 25, and the coil 24 to the contactor 21 that is in the control circuit heretofore described. The holding coil 44 of relay 7 is connected in a circuit extending from terminal 31 of relay 6 to a terminal 162a of relay 7, variable reactor 45, and coil 44 to contactor 41 that is in the control circuit heretofore described. Likewise, the holding coil 54 of the relay 8 is connected in a circuit extending from terminal 31 of relay 6 through a terminal 163a of relay 8, variable resistor 55, coil 54, to contactor 51 that is in the control circuit heretofore described. It will thus be seen that the several holding coils 54, 44 and 24 are connected between the A phase conductor and the contactors 54—41, 41—21 and 21, respectively. By reason of the variable resistors and reactor being in circuit with the several holding coils, it is possible to adjust the values at which the several relays 6, 7 and 8 operate and, accordingly, to adjust the current conditions at which the several relays will open their contactors 21, 41 and 51 under conditions hereinafter described.

Assuming the contactors 2 to be in their open positions and no voltage to be applied to the system, the mechanical parts of the operating device 5 are in the positions shown in Fig. 3 and the electrical connections are those shown in the control circuit of Fig. 5. Upon the application of potential to the system, the potential and the phasing coils of the several relays are energized. As soon as the predetermined conditions are reached in phase C, the relay 8 closes its contactor 51, thereby energizing its holding coil 54. Thereupon, the relay 7 closes its contactor 41 to energize its holding coil 44. Finally, the relay 6 closes its contactor 21, thereby energizing its holding coil 24. By referring to the control circuit, it is obvious that the holding coils of the relays 7 and 6 can only be operated successively after the closing of the contactor 51 of relay 8 for the reason that the contactor 51 is common to the circuits of the holding coils of the several relays and, in the case of relay 6, upon the additional closing of the contactor 41.

Upon the completion of the operating circuit by the closing of the contactors 21, 41 and 51, the solenoid 65 becomes energized and draws its armature 67 upwardly, at the same time raising the lever 114. During this period, the arm 84 is held in an intermediate position by the engagement of the notch 119 with the pin 121.

As the lever 114 is drawn upwardly, the lever 103 turns about the shaft 102 until the notch 119 disengages the pin 121, whereupon the switch arm 84 is turned in a counter-clockwise direction and the bridging member 87 engages the stationary contact members 89 and 91, in which position it is locked by the engagement of the projection 109 with the latch 105. The reclosing circuit is thereby completed.

Upon the energization of the solenoid 68 the larger unit 71 of its armature member is drawn upwardly, thereby straightening out the toggle mechanism comprising the arms 77 and 82 and the links 76 whereby a counter-clockwise movement is imparted to the shaft 83. Movement of the shaft 83 is transmitted through the coupling 4 to close the contactors 2.

Simultaneously with the upward movement of the larger unit 71 of the armature member, the smaller unit 72 is drawn quickly downwardly, whereby near the end of its travel, the stop 124 strikes the latch 105 a sharp blow thereby disengaging the lug 109. The rocking member 96 is given a quick clockwise movement by the contraction of spring 97, whereby extension 100 engages tail piece 101, thereby disengaging the bridging member 87 from the stationary contacts 89 and 91 and breaking the closing circuit. During the foregoing movement, the notch 122 is slipped behind the roller 95 and the crank 78 is thus latched in an open position. The link 117 serves to hold the notch 122 in contact with roller 95 by reason of the armature 67 and the lever 124 being held in an upward position by the solenoid 65. During the closing movement of the contactors 2, the spring 18 is placed under tension.

As has been previously stated, the operating circuit of the solenoid 65 is in series relation with the contacts 21, 41, and 51 of the several relays 6, 7 and 8, respectively. Upon the occurrence of conditions of power-reversal, voltage-failure or improper phasing in any one of the phase connections, the corresponding relay will be sufficiently energized to overcome the attraction of its holding coil and its contactor will be opened, thereby de-energizing the solenoid 65. Likewise, voltage failure upon the entire system de-energizes the solenoid 65.

Upon the solenoid 65 becoming de-energized, the weighted armature 67 drops with a sharp movement and depresses the lever 114, whereupon the levers 103 and 104 are given a counter-clockwise movement about the shaft 102. This movement serves to free the roller 95 from the notch 122 and to place the notch 119 in the path of the pin 121. The first movement releases the locking means that has heretofore resisted the force of the spring 18 in tending to open the contactors 2. That locking force having been removed, the spring 18 contracts and throws the contactors 2 to their open position, at the same time closing the pilot switch 18 and breaking the toggle comprising the arms 77 and 82 and the links 76. During this movement, the downward movement of the arm 77 engages the arm 99 of the lever 96 causing the latter to turn in a counter-clockwise direction, whereby the springs 97 and 98 are placed under tension.

The crank 78 is turned in a counter-clockwise direction by reason of the collapse of the toggle device heretofore defined, although the arm 84 is prevented from moving by reason of the engagement of the pin 121 with the notch 119. Accordingly, the parts are in the respective positions which they occupied at the beginning of the cycle of operation. The foregoing cycle of operations may be repeated indefinitely and automatically.

It will thus be seen that I have devised a protective device for alternating-current polyphase networks that is characterized by the disconnection of the feeder circuit upon the occurrence of undesired conditions of voltage, current reversal with respect to its voltage wave, and phasing relations and in which the disconnected circuit is reconnected upon the restoration of the desired circuit conditions. Furthermore, I have devised an operating device for actuating the contactors that is characterized by having a contactor that occupies successively a fully open, an intermediate and a closed position, and mechanism for causing the contactor to successively occupy these positions and thereby obtain positive operation without the danger of pumping or obtaining false closing and opening.

I do not wish to be restricted to the specific circuit connections or arrangement of parts herein set forth, as various modifications thereof may be effected without departing from the spirit and scope of my invention. I desire, therefore, that only such limitations shall be imposed as are indicated in the appended claims.

I claim as my invention:

1. In a protective system, an electromagnet, a second electromagnet for actuating a switch, means for controlling the circuit of the second electromagnet in accordance with the condition of the first electromagnet including a contactor having an open position, an intermediate position of rest and a closed position.

2. In a protective system, an electromagnet, a second electromagnet for actuating a switch, means for controlling the circuit of the second electromagnet in accordance with the condition of the first electromagnet including a contactor having a fully open position, an intermediate position of rest and a closed position, and means for causing said contactor to automatically occupy its several positions in sequence upon the interruption and restoration of the circuit of the first-named electromagnet.

3. In a protective system, an electromagnet, a weighted armature therefor, a second electromagnet for actuating a switch, means for controlling the circuit of the second electromagnet in accordance with the condition of the first electromagnet including a contactor having an open position, an intermediate position of rest and a closed position, and means for causing said contactor to automatically occupy its several positions in sequence upon the interruption and restoration of the circuit of the first-named electromagnet, said controlling means being influenced by the operation of the second electromagnet.

4. In a protective system, an electromagnet, a second electromagnet for actuating a switch, means for controlling the circuit of the second electromagnet in accordance with the condition of the first electromagnet including a contactor having a fully open position, an intermediate position of rest and a closed position, and a plurality of latch members and springs for causing said contactor to automatically occupy its several positions in sequence upon the interruption and restoration of the circuit of the first-named electromagnet.

5. In a protective system, an electromagnet, a weighted armature therefor, a second electromagnet for actuating a switch, means for controlling the circuit of the second electromagnet in accordance with the condition of the first electromagnet including a contactor having an open position, an intermediate position of rest and a closed position, and a plurality of latch members and springs for causing said contactor to automatically occupy its several positions in sequence upon the interruption and restoration of the circuit of the first-named electromagnet, certain of said latch members being influenced by the operation of the second electromagnet.

6. In a protective system, an electromagnet, a weighted armature therefor, a second electromagnet for actuating a switch, means for controlling the circuit of the second electromagnet in accordance with the condition of the first electromagnet including a contactor having an open position, an intermediate position of rest and a closed position, and a plurality of latch members and springs for causing said contactor to automatically occupy its several positions in sequence upon the interruption and restoration of the circuit of the first-named electromagnet, the energy for the actuation of the contactor being stored in certain of said springs upon the operation of the second electromagnet.

7. In a protective system, an electromagnet, a weighted armature therefor, a second electromagnet for actuating a switch, means for controlling the circuit of the second electromagnet in accordance with the condition of the first electromagnet comprising a contactor having an open position, an intermediate position and a closed position, and a plurality of latch members and springs for causing said contactor to automatically occupy its several positions in sequence upon the interruption and restoration of the circuit of the first-named electromagnet, the energy for the actuation of the contactor being stored in certain of said springs upon the operation of the second electromagnet, the energy for the actuation of one of the latch members being supplied by the first electromagnet, and the energy for the actuation of another of the latch members being supplied jointly by both electromagnets.

8. In a protective system, an electromagnet, a weighted armature therefor, a second electromagnet for actuating a switch, means for controlling the circuit of the second electromagnet in accordance with the condition of the first electromagnet comprising a contactor having an open position, an intermediate position and a closed position, and a plurality of latch members and springs for causing said contactor to automatically occupy its several positions in sequence upon the interruption and restoration of the circuit of the first-named electromagnet, the energy for the actuation of the contactor being stored in certain of said springs upon the operation of the second electromagnet, the energy for the actuation of one of the latch members being supplied by the first electromagnet, and the energy for the actuation of another of the latch members being supplied in sequence by both electromagnets.

9. In combination, a contactor, a shaft, a plurality of latch members mounted on said shaft for controlling the movement of the contactor, a plurality of electromagnets, connecting means between one of said latch members and one of said electromagnets and connecting means between another of said latch members and both of the electromagnets.

10. In combination, a contactor, a plurality of resilient means for actuating the contactor, a shaft, a plurality of latch members mounted on said shaft for controlling the sequence of movements of the contactor under the influence of the resilient members, a plurality of electromagnets, connecting means between one of said latch members and one of said electromagnets and connecting means between another of said latch members and both of the electromagnets.

11. In combination, a contactor, a solenoid, a multipart armature for the solenoid, means for mechanically connecting the contactor to one part of the armature, and a latch connected to another part of the armature.

12. In combination, a contactor, a solenoid, an armature member therefor comprising a plurality of independent units, means for mechanically connecting one unit of the armature to the contactor, and a latch connected to another unit of the armature.

13. In combination, a contactor, a solenoid, an armature member therefor comprising a plurality of independent units, means for mechanically connecting one unit of the armature to the contactor whereby motion may be imparted to the latter, and a latch connected to another unit of the armature for determining a position of rest for the contactor upon the energization of the solenoid.

14. In combination, a contactor, a solenoid, an armature member therefor comprising a plurality of independent units of unequal mass, means for mechanically connecting a unit of relatively large mass to the contactor whereby motion may be imparted to the latter, and a latch connected to a small unit for determining a position of rest for the contactor upon the energization of the solenoid.

15. In combination, a rocking member, a shaft therefor, a contactor loosely mounted on the shaft adjacent to the rocking member, a resilient member connected between the rocking member and the contactor, a resilient member connected to the rocking member, and means for positively actuating the rocking member, whereby the contactor and the rocking member may be moved in unison or independently.

16. In combination, a rocking member, a shaft therefor, a contactor loosely mounted on the shaft and in the path of movement of the rocking member, a resilient member connected between the rocking member and the contactor, a resilient member connected to the rocking member, means for positively actuating the rocking member, whereby the contactor and the rocking member may be moved in unison or independently, and a system of latches for controlling such movements.

17. In combination, a rocking member, a shaft therefor, a contactor mounted on the shaft in the path of movement of the rocking member and yieldingly connected thereto, a resilient member connected to the rocking member, and means for positively actuating the rocking member, whereby the contactor and rocking member may be moved in unison or independently, the actuating means comprising a plurality of electromagnets and a system of latches for controlling such movements.

18. In combination, a polyphase switch, an actuating device for the switch, and a separate relay connected to each phase conductor of the switch for controlling the actuating device under conditions of energy reversal in the switch and in accordance with the phase and voltage conditions across the switch.

19. In combination, a polyphase switch, a low-voltage responsive actuating device for the switch, and a relay including a contactor connected to each phase conductor of the switch, said relays being responsive to conditions of current reversal in their associated conductor and to conditions of phase and voltage across the switch and in their related phase conductors, the contactors of the several relays being connected in series relation to each other and to the actuating device.

20. A control device including a panel having mounted thereon a polyphase switch, an actuating device for closing the switch, and a relay for each phase of the switch, each of the relays including a contactor having a holding coil, the several contactors being connected in series relation to each other before said actuating device is energized.

21. A control device including a panel having mounted thereon a polyphase switch, an actuating device for the switch serving to keep the switch closed only when a predetermined potential is applied thereto, and a relay for each phase of the switch, each of the relays including a contactor having a holding coil, the several contactors being connected in series relation to each other before said actuating device is energized.

22. A control device including a panel having mounted thereon a polyphase switch, an actuating device for the switch serving to keep the switch closed only when a predetermined potential is applied thereto, and a relay for each phase of the switch, responsive to conditions of energy reversal therein and to phase and potential conditions thereacross, each of the relays including a contactor, the several contactors being connected in series relation to each other and to the actuating device, whereby said switch remains closed only so long as predetermined conditions of phase, current and potential exist.

23. In a control device for a polyphase switch, an operating device, a relay for each phase of the switch, said relays co-operating to control the operating device, one of said relays including a variable reactor and a co-operating relay including a variable resistor for controlling the phase conditions under which the operating device is energized.

24. In a control device for a polyphase switch, an operating device, a relay for each phase of the switch, said relays co-operating to control the operating device, one of said relays including a variable reactor and another of said relays including a variable resistor, said variable resistor and reactor being connected in circuit with each other for controlling the phase conditions under which the operating device is energized.

25. A control device including a polyphase switch, an actuating device for the switch and relay means connected with each phase of the circuit and responsive to direction of energy flow and to phase and magnitude of potentials at the terminals of said switch, said relay means having contact means arranged to control the actuating device in response to said conditions in any one phase.

26. A member to which it is desired to impart reciprocating motion, electric-motor means therefor, and control means for said motor comprising contacts controlling said motor means adapted to bias said contactor to closed position when said member is at one end of its stroke, a latch adapted to prevent said bias means from closing said contacts, means for releasing said latch to permit said contacts to close, and means adapted to open the contacts when said member reaches the other end of its stroke.

27. A unit mechanism for operating a circuit interrupter having a reciprocable member, electro-responsive means adapted to move the member to one position, latching means for the member to retain it in that position, contact means for completing a circuit to the electro-responsive means, a latch for retaining the contact means in open-circuit position and a second electro-responsive means for controlling both of the latches to reciprocate the member.

28. A unit mechanism for operating a circuit interrupter having a reciprocable member, electro-responsive means adapted to move the member to one position, latching means for the member to retain it in that position, contact means for completing a circuit to the electro-responsive means, a latch for retaining the contact means in open-circuit position and means responsive to changes in the circuit conditions and associated with the said latches for reciprocating the member.

29. The combination with a member to be reciprocated, an electric motor for moving the member in one direction, a spring-actuated contact member completing a circuit to the motor, a latch retaining the contact in open position, a second latch retaining the first said member in the position which it occupies after said movement, and an electro-responsive means associated with the latches adapted to selectively procure their release under predetermined conditions.

30. An operating mechanism for a circuit interrupter comprising a reciprocable member and an electro-responsive means for moving it to one position, bias means for moving it to another position, a latch for retaining it in said first position against the stress of said bias means, a contact element for completing a circuit to the electro-responsive means, retaining means adapted to hold said contact element in open position, a second electro-responsive means controlling the said retaining means and the latch to procure the movement of the reciprocable member to another position.

31. In combination, a contactor, a shaft, a plurality of latch members mounted on the shaft for controlling the position of the contactor, a plurality of electromagnets, one of the electromagnets being operatively connected to the latch members and a movable member cooperating with said latch members and operatively connected to another electromagnet.

32. In a circuit-controlling device, a switch-operating mechanism actuated by an electromagnet, a contactor for controlling the circuit of said electromagnet, a latch mechanism for controlling the switch-operating mechanism and the position of the contactor, and a second electromagnet for actuating the latch mechanism to permit the contactor to close.

33. In combination, a solenoid, a contactor for controlling the solenoid, a movable member actuated by the solenoid, a latch mechanism cooperating with said movable member and adapted to retain the contactor in its open or its closed position and a second solenoid for actuating the latch mechanism.

34. In a circuit-controlling device, an electromagnet, a contactor for controlling the circuit of said electromagnet, a latch mechanism for controlling the position of the contactor, and a second electromagnet for directly actuating the latch mechanism, said latch mechanism being also controlled by the first-named electromagnet.

35. In a circuit-controlling device, an electromagnet, a switch-operating member actuated by said electromagnet, a contactor for controlling the circuit of said electromagnet, a second electromagnet and means directly actuated by the second electromagnet for causing the closing of the contactor, and means responsive to the actuation of the switch operating member for opening the contactor.

36. In a circuit-controlling device, a switch-operating arm, an electromagnet for actuating said arm, a contactor, a latch mechanism for controlling the position of the contactor, a second electromagnet for directly actuating the contactor, and means comprising said latching mechanism whereby the contactor is released by the first-named electromagnet.

37. In a circuit-controlling device, a switch-operating member, a contactor, a plurality of electromagnets, and an adjustable latch mechanism for controlling the position of said contactor, one of said electromagnets actuating said latching mechanism to permit said contactor to close and the other electromagnet actuating said member and effecting the opening of said contactor.

38. In a circuit-controlling device, a switch-operating mechanism, an electromagnet for actuating said mechanism, a contactor for controlling the circuit of said electromagnet, and an adjustable latch mechanism for controlling the switch-operating mechanism and the position of the contactor, and a second electromagnet for directly actuating the latch mechanism.

39. The combination with two switch-operating members and actuating means therefor comprising a plurality of electromagnets, the electromagnets for one of said members being controlled by the other member, of a latching mechanism for operatively connecting said members and for latching said other member in open position until said latching mechanism has been actuated by another electromagnet to release said other member.

In testimony whereof, I have hereunto subscribed my name this 22nd day of January, 1925.

JOHN B. MacNEILL.